United States Patent [19]

Broms et al.

[11] 4,391,183

[45] Jul. 5, 1983

[54] HYDRAULIC BLOCKING VALVE

[75] Inventors: Stig Broms, Täby; Lennart Freese, Järfälla, both of Sweden

[73] Assignee: Innovation Aktiebolag, Sundbyberg, Sweden

[21] Appl. No.: 121,619

[22] Filed: Feb. 14, 1980

[30] Foreign Application Priority Data

Feb. 22, 1979 [SE] Sweden ............................ 7809012

[51] Int. Cl.[3] .................. F15B 13/042; F16K 31/122

[52] U.S. Cl. .................................. 91/461; 91/445; 251/35; 251/41; 251/44; 137/DIG. 2

[58] Field of Search ...................... 91/445, 461, 454; 251/35, 41, 44; 137/DIG. 2

[56] References Cited

U.S. PATENT DOCUMENTS

| | | | |
|---|---|---|---|
| 641,009 | 1/1900 | Gulland | 251/42 |
| 781,913 | 2/1905 | Schutte | 251/44 X |
| 1,146,009 | 7/1915 | Mason | 251/35 |
| 1,826,088 | 10/1931 | Ostlind | 251/44 |
| 2,055,576 | 9/1936 | Hollerith, Jr. | 251/44 X |
| 2,342,659 | 2/1944 | Grove et al. | 137/DIG. 2 |
| 2,569,881 | 10/1951 | Davies | 251/41 X |
| 2,653,624 | 9/1953 | Klessig | 251/44 |
| 2,927,766 | 3/1960 | Orloff | 251/35 |
| 3,023,997 | 3/1962 | Schultz | 251/44 X |
| 3,360,234 | 12/1967 | Thorburn | 251/44 |
| 3,905,393 | 9/1975 | Hartwig | 137/DIG. 2 |
| 4,009,860 | 3/1977 | Lingnau | 251/44 |

FOREIGN PATENT DOCUMENTS 1317463 5/1973 United Kingdom .

*Primary Examiner*—George L. Walton

*Attorney, Agent, or Firm*—Flynn, Thiel, Boutell & Tanis

[57] ABSTRACT

The invention relates to a hydraulic blocking valve, a so-called holding valve (10), the shutting-off member of which consists of a movable ball (16) coacting with a seat (17) in an inlet chamber (24). The space (15) on the side of the ball opposite its seat forms an operating chamber (15), and both chambers are joined by a constriction passage (13) counteracting flow of hydraulic liquid between the chambers. The operating chamber (15) is in communication with valve means (32) by the aid of which the pressure in the operating chamber can be heavily reduced, e.g. by being taken to a tank (44), resulting in that the ball (16) is thrust from its seat (17) to open the valve. A throttling means (25, 26) simultaneously comes into action for reducing the flow, i.e. liquid loss through the valve means (32) from the operating chamber (15). When the valve means is subsequently closed, pressure is once again built up against the ball so that the latter is pushed towards its seat (17) for closing the valve (10).

4 Claims, 7 Drawing Figures

HYDRAULIC BLOCKING VALVE

FIELD OF THE INVENTION

The present invention relates to hydraulic valves, and more particularly to a new type of hydraulic blocking valve, a so-called holding valve.

BACKGROUND OF THE INVENTION

This kind of valve is generally used in hydraulic systems for leakage-free blocking of conduits and the like, often to eliminate "load sinking" in different types of hydraulic cylinders. This load sinking occurs when a load, work implement or the like, which is kept raised at a certain level by such a cylinder, slowly sinks or in some other way alter its position due to hydraulic liquid leaking out from the pressure side of the cylinder because of internal leakage in the hydraulic system, e.g. at the cylinder operating valve, in spite of this value being in its neutral position and thus closed.

The valve types which up to now have been used to eliminate load sinking, e.g. pilot-controlled non-return valves or so-called overcentre valves have characteristics intrinsic with their functional principle such that they become unsuitable for their purpose in certain cases. Amongst other things, such a valve can have a flow resistance which is so large that the hydaulic cylinder is given a reduced maximum working speed, and furthermore, it is not possible to use these valve types without considerable complications for single acting hydraulic cylinders, so called telescopic cylinders.

The invention thus has the object of providing a holding valve of a kind in question, which can be used in all cases where leakagefree blocking, or holding, in a hydraulic system is desired without the system otherwise being affected, and without any extensive modification of the system being required. The object is achieved, and a hydraulic holding valve is provided in which the disadvantages indicated above and associated with earlier, similar valves have been obviated, by the valve in accordance with the invention having been given the characterizing features disclosed in claim 1.

BRIEF DESCRIPTION OF THE DRAWINGS

Some embodiments of the invention will now be described by way of example, with reference to the accompanying drawings, on which FIG. 1 is a cross section through a holding valve in accordance with the invention, depicted in co-action with a schematically indicated hydraulic system, the valve being shown in a first (closed) position, while

DETAILED DESCRIPTION

Figure 1:
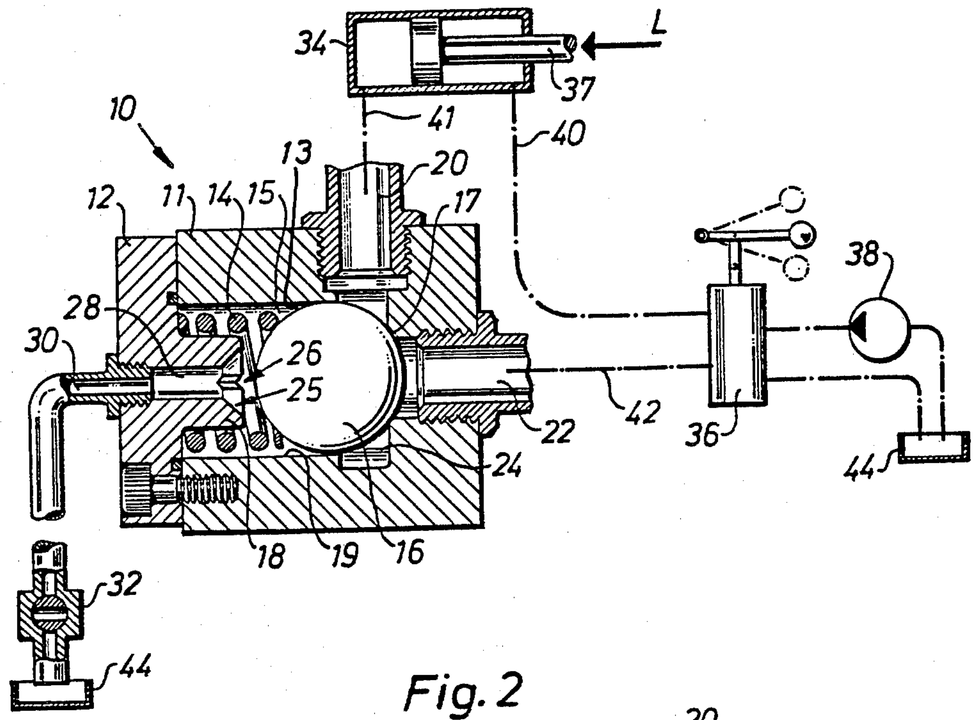

As will be seen from FIG. 1, a holding valve 10, in accordance with the invention, includes a valve housing 11 with cover 12, a valve body in the form of a ball 16 and a spring 14 actuating the ball 16. Further to the holding valve 10, the coacting hydraulic system comprises, according to FIG. 1, a working cylinder 34, an operating valve 36, a hydraulic pump 38, a tank or sump 44, a control valve 32 and hydraulic conduits connecting the components. Thus, the inlet port 20 of the valve 10 is in communication with one port of the working cylinder 34 via a conduit 41, while the outlet port 22 of the valve 10 is in communication with the operating valve 36 via a conduit 42. The cylinder 34 and operating valve 36 are furthermore mutually connected via a return conduit 40.

The ball 16 of the holding valve 10 is accommodated easily movable in a cylindrical bore 19 in the housing 11, the bore having a diameter which is slightly larger than that of the ball, so that a narrow gap 13 is formed round the latter. As seen in the figures, the ball moves between right and left end positions in the bore 19, thus separating the bore into a left chamber 15 and right chamber 24, chamber 24 forming an inlet chamber in communication with the inlet port 20, while the left chamber 15 forms an operation chamber, as will be explained below. In its right-hand end position (FIG. 1), the ball 16 is in sealing contact with a seating surface 17 concentric with the bore 19 and formed in the right-hand portion of the housing 11 between the inlet chamber 24 on one side and the outlet port 22 on the other. In its left-hand end position, the ball is arrested by a boss 18, which can have the form of a projection on the valve housing cover 12 thrusting into the operating chamber 15. A seating surface 25, which can be conical for example, is formed concentric with the bore 19 in the end of the boss 18. The seating surface 17 as well as the seating surface 25 can have optional active diameter in relation to the diameter of the ball 16, i.e. the diameter of the seats can be merely slightly less than the diameter of the ball or considerably less, as illustrated in FIG. 1. The seats do not need to have the same mutual diameter either. In the seating surface 25 there is also a local depression, e.g. in the form of a notch or groove 26, and behind the seating surface 25 there is a recess or auxiliary chamber 28 which is connected to the control valve 32 by means of a pilot conduit 30, said control valve consisting, for example, of a hand-operated closing valve such as a needle or plug valve. The outlet of the control valve 32 is in its turn in communication with the tank 44.

It will be easily understood that the position of the ball 16 is determined by the forces acting on it, said forces being the bias of the spring 14 (acting towards the right in the figure) inserted between the valve housing cover 12 and the ball 16, and the forces from the hydraulic pressures acting on the ball. Consider first the position illustrated in FIG. 1, the hydraulic system being assumed unpressurized and inactive. The ball 16 will then be urged by the spring 14 against the right-hand seating surface 17. The control valve 32 is closed in this situation. If the cylinder 34 is now loaded by a force L, acting to the left in FIG. 1, pressure in the conduit 41 will increase and thereby that in the inlet port 20 of the valve 10 and in the chamber 24, e.g. to a value of 15 MPa (international SI units 150 $kp/cm^2 = 2200$ psi). Since the control valve 32 is closed, there can be no flow of hydraulic medium (hydraulic oil) from the operating chamber 15 at the left of the ball to the pilot conduit 30. Pressure in the chamber 15 therefore immediately increases to the same level as the pressure in the chamber 24, due to the communication between the chambers formed by the gap 13 between the ball and the bore 19. The same pressure $p_1$ (15 MPa in the selected example) will thus prevail over the whole of the ball's surface outside (to the left of) the seating surface 17. If the outlet 22 is presumed still to be unpressurized, i.e. the operating valve 36 is in its neutral position, the ball will thus be subjected to a force $F_{br}$ towards the right, and of the magnitude $$F_{br}=F_s+p_1 \cdot A_{17} \quad \ldots (1)$$

where $F_s$=force exerted by spring 14

$p_1$=pressure in the inlet port 20 (=pressure in the cylinder 34)

$A_{17}$=active area of the seating surface 17.

The valve ball 16 is thus pressed firmlly against its seat 17 and the valve will remain closed in this position, irrespective of the pressure in the inlet port 20. The valve 10 thus prevents all leakage from the cylinder 34, and thereby also prevents the cylinder piston 37 from moving to the left, which can be presumed to be a sinking movement in accordance with the previously stated definition.

The valve 10 thus serves as a leak-free lock, i.a. a holding valve for the cylinder 34. For the cylinder piston 37 to be displaced to the left with the aid of the operating valve 36, the holding valve 10 must be first released or opened. This is done by opening the control valve 32, which is given a suitable, conveniently accessible placing, the result being as follows (see FIG. 2). The pilot conduit 30, now connected to a tank, will be immediately unpressurized. This also applies to the operating chamber 15, which freely communicates with the pilot conduit via the auxiliary chamber 28. But since a high pressure (15 MPa, in the example above) still prevails in the chamber 24, and any pressure equilization by flow past the ball through the narrow gap 13 thereabout does not have time to occur, the prevailing pressure in the chamber 24 will develop a force to the left on the ball, considerably greater than that of the spring 14. The ball therefore moves rapidly to the left until it meets and engages with the seat 25. The seat 17 is simultaneously uncovered, so that a free, practically unconstricted connection occurs between the chamber 24, i.e. the inlet 20, and the outlet 22. The hydraulic medium can thus pass freely through the valve in both directions between the ports 20 and 22, so that the piston 37 of the working cylinder 34 can be operated unobstructedly and at optical velocity in both directions, with the aid of the operating valve 36, see FIG. 1.

Figure 2:
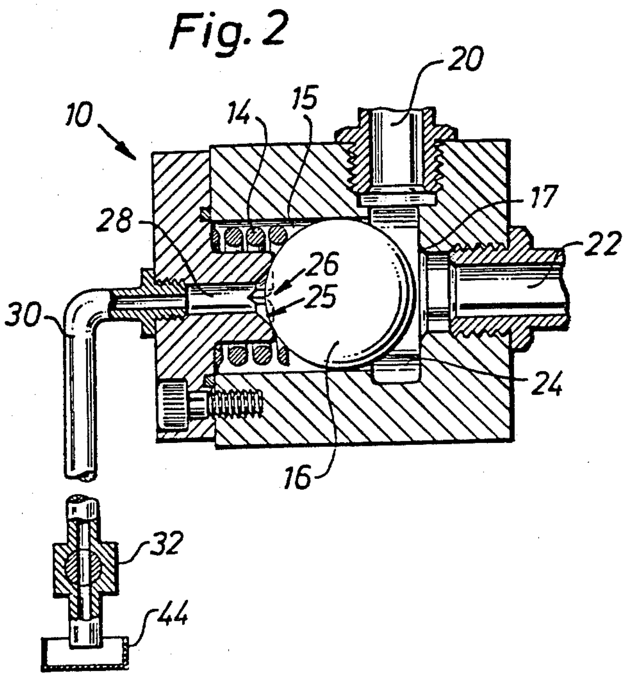
FIG. 2 shows the valve in a second (open) position.

Essential to the function of the holding valve in accordance with the invention is the coaction of the ball 16 with the seat 25, when the valve assumes its open position illustrated in FIG. 2. In actual fact, the valve together with the seat forms a constriction means or restrictor. In this case the ball engages with the seating 25, but due to the groove or depression 26 therein, there is a constricted flow or leakage flow from the operating chamber 25 on the left of the ball, said flow being drained to the tank 44 via the auxiliary chamber 28 and pilot conduit 30. The pressure in the chamber 15 is only slightly lower than the pressure $p_1$ on the right of the ball, and the latter is kept in engagement with the seat 25 by a force $F_{bl}$ directed to the left, provided that $$F_{bl}=p_1 \cdot A_{25} F_s \quad \ldots (2)$$

where $A_{25}$=active area of the seat 25 and $F_s$=force of the spring 14.

If the control valve 32 is now closed, the pressure in the pilot conduit 30 and chamber 28 will be rapidly built up via the groove 26 to the same pressure as in the operating chamber 15, i.e. the force $F_{bl}$ falls to zero. At the same instant, the ball 16 is urged to the right by the spring 14, until it makes contact with the seat 17 and thus closes the valve. The velocity of the ball is determined by the spring force $F_s$, the cross-sectional area of the ball, the gap area between the ball and the bore 19 and the viscosity of the hydraulic medium; in other words how rapidly the medium manages to pass by the ball through the gap about it.

Due to the groove or depression 26 and the leakage flow thus created, the valve can be operated from open to closed position and vice versa by means of the control valve 32, irrespective of the working pressure in the cylinder 34. It is naturally a necessary requirement for a hydraulic holding valve of this type that it can be rapidly opened and closed on order, irrespective of the pressure and flow conditions prevailing in the conduit in which the valve is located. On the other hand, it is also a condition that the described leakage in the valve, when it is open, is as little as possible, since this flow represents a loss and gives increased sinking of the load in incidental positions of rest. With the high working pressures used in modern hydraulic systems (up to 30 MPa and above) the constriction arranged between the chambers 15 and 28 must have a very small cross-sectional area. For example, if the working pressure is assumed to be a maximum of 30 MPa (300 $kp/cm^2$=4400 psi) and the permitted leakage loss is allowed to be at most 0.2 1/min, the constriction area must be about 0.1 $mm^2$, a purely dynamic pressure loss being assumed. If this constriction were to be arranged in the form of a radial hole through the boss 18 between the chambers 15 and 28, the hole would have a diameter of only about 0.3 mm, which would make the constriction sensitive to foreign matter in the liquid, so that it easily became obstructed. The leakage flow would then cease entirely, and the valve would loose its closing function, described above. By forming the constriction as a depression or groove 26 in the seating surface 25 itself, as illustrated in FIGS. 1 and 2, a more suitable geometric shape for the constriction can be selected, with regard to the risk of its becoming choked. Furthermore, the constriction will be self-cleaning, since possible foreign bodies are automatically washed away when the ball lifts from the seat 25.

Figure 3:
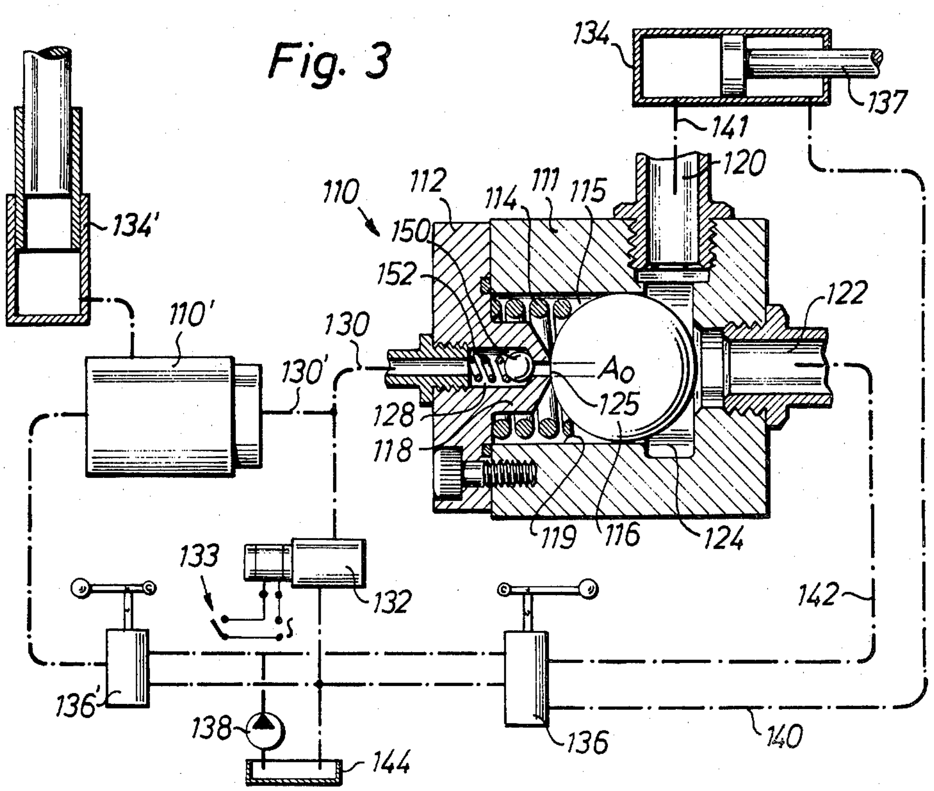
FIG. 3 is a view analogous with that in FIG. 1 but showing a modified embodiment of the valve.

A holding valve 110, in accordance with the invention, is illustrated in FIG. 3, and has a somewhat different form of the constriction means between valve and pilot conduit. As previously, the valve 110 comprises a valve housing 111 with valve housing cover 112, a ball 116 accommodated in a bore 119, and a spring 114, the ball separating an inlet chamber 124 from an operating chamber 115. The inlet port 120 of the valve is connected to a working cylinder 134, while its outlet 122 is in communication via a hydraulic pressure conduit 142 with the operating valve 136 of the system. The latter valve is also in communication with the cylinder 134 via a return conduit 140. Apart from a pump 138 and a tank 144, the hydraulic system according to FIG. 3 also comprises a further cylinder 134' of the so-called single acting telescopic type, a holding valve 110' identical with the valve 110, a second operating valve 136' with associated hydraulic pressure conduits, and pilot conduits 130 and 130′ from the respective holding valve to a common control valve 132, in communication with the tank 144.

The boss 118 projecting from the cover 112 is in this case formed as a jet 125, with a flat circular nose surface and an active area $A_o$, see FIG. 3. The end surface of the boss facing towards the ball 116 can otherwise have an optional, e.g. conical, shape. If the valve is open, and the spring 114 is neglected for a moment, the ball 116 will be urged by the pressure $p_1$ towards the left against the jet 125 with the force $$F_{b1}=p_1 \cdot A_o \qquad \ldots (3)$$

If the maximum pressure of $p_1$ is assumed to be 30 MPa (=3 kp/mm$^2$), and the diameter of the jet 2.5 mm, i.e. $A_o$ 5 mm$^2$, the leftwardly directed force $F'_{b1}$ on the ball 116 will be at most 3×5=15 kp when the valve is open. But if the force $F_s$ of the spring 114 is selected as greater than this value, e.g. 20 kp, the ball cannot be kept by the pressure $p_1$ in sealing engagement with the seat formed by the jet 125, but will be kept away from this seat by the spring. The result will be that an annular gap is formed between the ball 116 and the seat or jet 125, and through this gap the hydraulic medium flows out from the operating chamber 115 to the pilot conduit 130. This overflow causes in turn a pressure drop in the chamber 115 so that the pressure $p_2$ therein becomes lower than the pressure $p_1$ in the inlet chamber 124. The ball will then be subjected to a leftwardly directed resultant force $F_{b1}$, generally applicable to which is that $$F_{b1}=(p_1-p_2)(A_b-A_o)+p_1A_o=p_1A_b-p_2(A_b-A_o) \qquad \ldots (4)$$

where $A_b$ is the cross-sectional area of the ball.

This force $F_{b1}$ is counteracted by the rightward force $F_s$ of the spring 114, and the ball 116 will automatically assume a position in relation to the tip of the jet, or seat 125, such that both forces continuously balance each other, i.e. so that $$F_{b1}=F_s \qquad \ldots (5)$$

The constriction between the ball and the jet tip 125 is thus self-adjusting and continuously adjusts itself to prevailing pressure, oil viscosity etc. For this reason, the constriction will be completely insensitive to foreign particles in the oil.

If the hydraulic force $F_{b1}$ acting on the ball 116 should completely overcome the spring bias $F_s$, the ball goes into sealing engagement with the jet 125, $p_2$ becomes $p_1$ and the expression (4) above becomes the one (3) previously set forth. However, the spring 114 should be dimensioned in relation to the maximum working pressure such that it cannot be overcome.

Between the opening of the jet 125 facing towards the ball 116 and the pilot conduit 130 there is inserted a non-return valve, e.g. in the form of a simple arrangement with a ball 150 acted upon a spring 152, said valve being fitted in an auxiliary chamber 128 behind the jet 125. In this way, one or more holding valves in accordance with the invention can be further connected to the common control valve 132, e.g. the valve 110′ illustrated in FIG. 3, this valve being intended for holding the cylinder 134′, the valves being connected via the common pilot conduit 130, 130′. When the control valve 132 is open, low pressure prevails in the pilot conduit, both holding valves 110 och 110′ thus being open. When the control valve is closed, both valves will also be closed, the pressure in the pilot conduit 130, 130′ rising to the greatest of the pressures prevailing in both cylinders 134, 134′. The non-return valve 150, 152, and the corresponding non-return valve in the holding valve 110′ prevents leaking between the cylinders taking place via the pilot conduit, if different rest of inactive pressures were to prevail in the cylinders.

The control valve 134 illustrated in FIG. 3 can consist, for example, of an electromagnetic closing valve, which in its turn is operated by a switch or a contact means 133.

Figure 4:
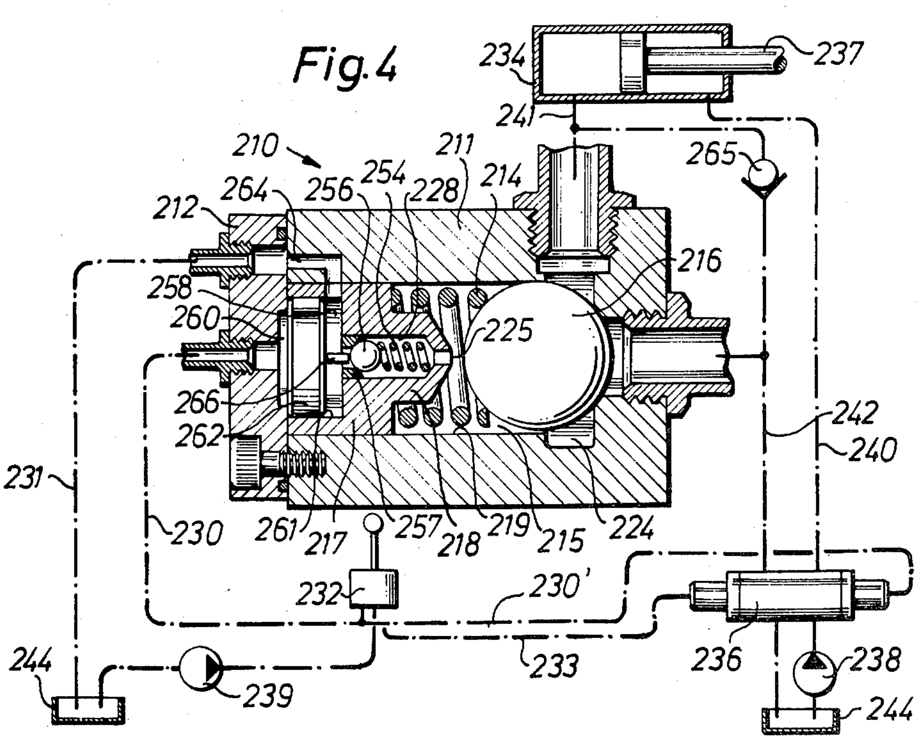
FIGS. 4 and 5 illustrate two further modified holding valves in accordance with the invention, together with associated schematically indicated hydraulic systems, and FIGS. 6 and 7 finally illustrate a further embodiment of the holding valve in accordance with the invention.

In FIG. 4 there is illustrated an automatically operating holding valve 210 in accordance with the invention, said valve having the distinguishing feature that the associated control valve consists of a pressure-sensing valve, built into the holding valve. Further to a spring 214 and a ball 216, which, in a bore 219, separates an inlet chamber 224 and an operating chamber 215, the holding valve 210 comprises in this embodiment a piston 262, which is displaceable in a bore 261 formed in a member 217 inserted in the lefthand end in FIG. 4 of the bore 219 of the valve ball. A boss 218 provided with a jet 225 projects to the right from the insert member 217, and a small non-return ball 256 is accommodated in an auxiliary chamber 228 behind the jet, the ball 256 being urged to the left against a seat 257 by a spring 254. A chamber 260 on the left-hand side of the piston 262 is in communication with a pilot conduit 230, while a chamber 258 to the right of the piston 262 is in constant communication with a tank 244 via a passage 264 and a return conduit 231. For the remainder, the hydraulic system in FIG. 4 is conceived to include a working cylinder 234, an operating valve 236, a pump 238, the tank 244 and pressure conduits 240, 241 and 242. The operating valve 236 consists of a so-called servocontrolled slide valve, i.e. the valve contains a slide or spool, which is set by pressure from a separate servo circuit comprising a pump 239, a hand-operated servo valve 232 and pilot conduits 230′ and 233.

The holding valve 210 in FIG. 4 coacts with the associated hydraulic system in the following way. When the operating lever of the servo valve 232 is in neutral, both pilot conduits 230′ and 233 are unpressurized, the slide valve 236 thus also being in neutral, with its slide kept in centered position by springs, all in accordance with conventional servo technology applied to this case. The pilot conduit 230, connected to the conduit 230′, is then also unpressurized, the piston 262 of the holding valve thus being in its lefthand position, as shown in FIG. 4. The non-return valve 254, 256 is then closed, the main valve ball 216 of the holding valve thus being kept in engagement against its seat, for reasons described above, and the holding valve is thus closed. If the lever of the servo valve 232 is now put into the position LOWER, signifying that pressure is let into the pilot conduit 230′ for displacing the slide of the valve 236 for the primary operation, pilot pressure will also be supplied to the chamber 260, causing the piston 262 to be displaced to the right, in doing which it thrusts, by way of a pin 266, the non-return valve ball 256 from its seat, so that the operation chamber 215 to the left of the main valve ball 216 is drained to the tank. As previously described, the ball 216 will then be displaced to the left into constricting coaction with the jet 225 so that the holding valve opens. The piston 237 of the working cylinder 234 can therefore, as seen in FIG. 4, move to the left without hindrance, which represents a sinking movement. As soon as the servo valve 232 is returned to neutral, with resulting unloading of the pressure in the pilot conduit 230', 230, the slide valve 236 is neutralized (closed) with the resulting arrest of piston 237. The pressure drop in the pilot conduit 230 simultaneously causes the piston 262 to go to the left, the non-return valve 254, 256 is closed and pressure is once again built up in the operating chamber 215 to the left of the ball 216, so that the holding valve is closed.

When, on the other hand, pressure is supplied to the pilot conduit 233 to displace the working cylinder 237 to the right, via the operating valve 236 and conduit 242, the pressurized fluid can either pass through the holding valve 210, which then functions as a non-return valve, or through a special non-return valve 265 arranged in the conduit 242.

The holding valve 210 in FIG. 4 thus works entirely automatically and synchronously with the operating valve 236, so that the working cylinder 234 is always held leak-free in a stationary position, but can move in both directions without hindrance, when so desired.

The control valve comprising piston 262, ball 256 and spring 254, together with surrounding parts of the valve housing 211 and cover 212, can naturally constitute a separate valve unit in communication with the valve 210 via a pilot conduit, the separate valve 210 being then constructed analogous to previously described embodiments of the holding valve in accordance with the invention, see FIGS. 1–3.

Figure 5:
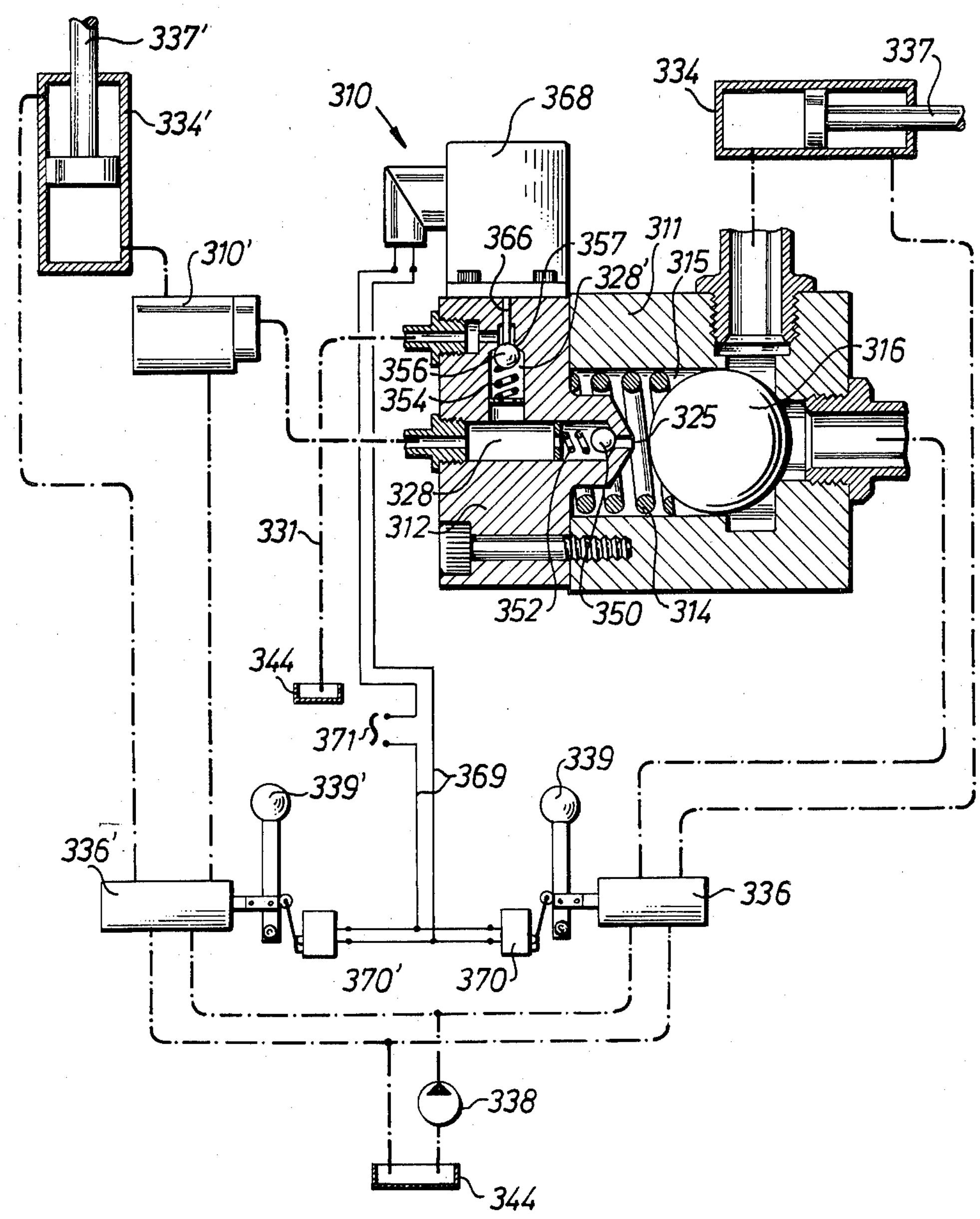

The embodiment 310 of the holding valve in accordance with the invention, shown in FIG. 5, has electrical control arranged such that automatic holding is obtained in the inactive or rest position. Here as well, the valve 310 includes a valve housing 311, a main valve ball 316 and a spring 314, and as with the nearest previous embodiments the ball is arranged to coact with a jet 325 in an operating chamber 315 when the valve opens. An auxiliary chamber 328 accommodating a non-return ball 350 with operating spring 352 is arranged in the cover 312 of the valve housing 311. A side chamber 328' is arranged with connection to the chamber 328, said side chamber accommodating a non-return valve consisting of a ball 356 urged by a spring 354 against a seat 357. The ball 356 of the valve can be thrust away from its seat i.e. downwards from its closing position shown in FIG. 5, by means of a pin 366 connected to a movable armature in a solenoid 368. The chambers 328, 328' are hereby drained by a return conduit 331.

Further to a working cylinder 334, intended for holding by the valve 310, the hydraulic system is conceived as including a working cylinder 334' with associated holding valve 310', and the latter can be identical to the valve 110 described in conjunction with FIG. 3, for example. The hydraulic system further includes manually operated operation valves 336 and 336', a pump 338, a tank 344 and hydraulic conduits between these components, as is apparent from FIG. 5. The auxiliary chamber 328 of the holding valve 310 and the corresponding chamber in the holding valve 310' are mutually connected by a pilot conduit 330.

The valves 310 and 310' are controlled electrically and served by contact means 370 and 370', arranged such that a current circuit to the solenoid 368 is closed as soon as either of the operating levers 339 and 339' are taken from neutral to the position LOWER. When the solenoid 368 is energized, the non-return valve 356 is opened by the pin 366, the chambers 328, 328' being drained to the tank via the return conduit 331, as previously mentioned. Both holding valves 310 and 310' are thereby immediately opened in the way described above. When the operating levers are returned to neutral, the valves are once again closed.

Further holding valves in accordance with the invention can naturally be connected and controlled commonly in the same way as illustrated for the valves 310, 310'.

As will be seen from the principle for the holding valves in accordance with the invention described above, there is a continuous flow of hydraulic liquid through the space surrounding the valve ball, when the valve assumes an open position. This naturally assumes that the hydraulic liquid is completely clean, so that no direct particles can come into the gap, which has a wedge-shaped cross section, and thus cause the ball to jam. To avoid such risks, the valve can be modified in a simple mode so that the leakage flow takes place through a conventional annular gap between cylindrical bodies, which form the ends of the gap with their sharp straight edges, so that larger particles are prevented from forcing their way into the gap, while smaller ones pass through without exercising any binding wedge action between the moving parts. Such a modified holding valve will be described in conclusion, with reference to FIGS. 6 and 7.

Figure 6:
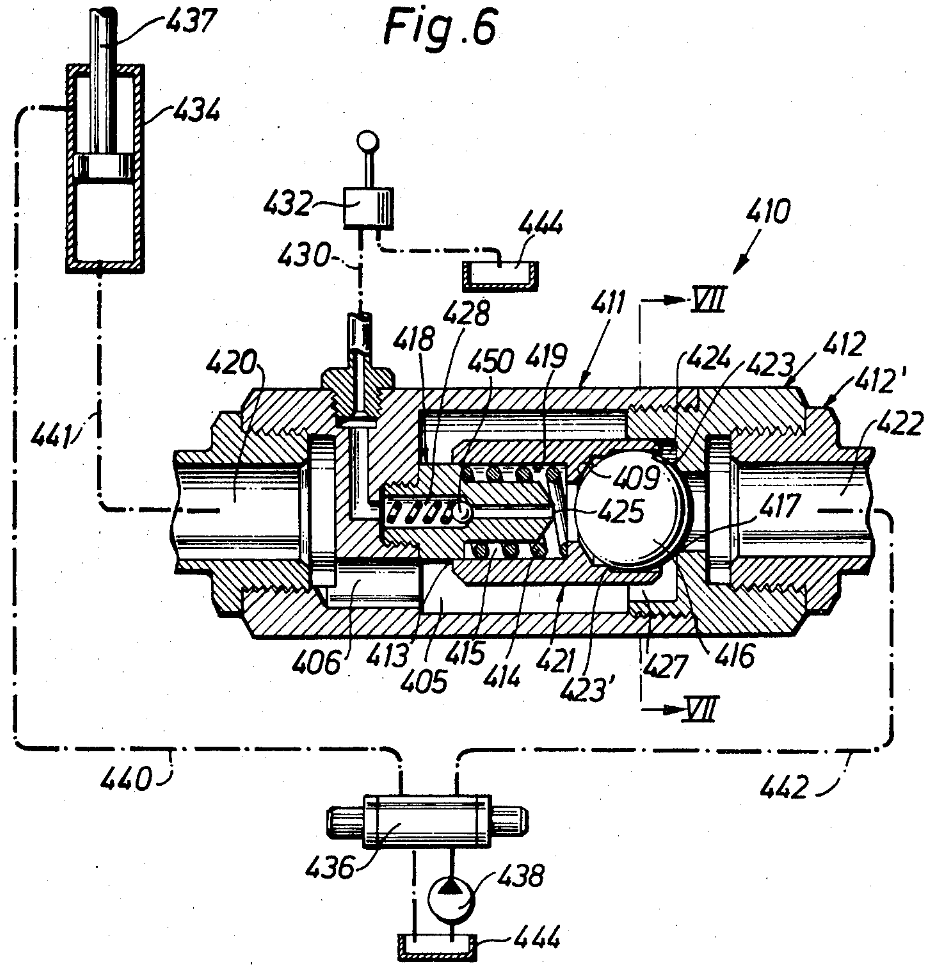
Figure 7:
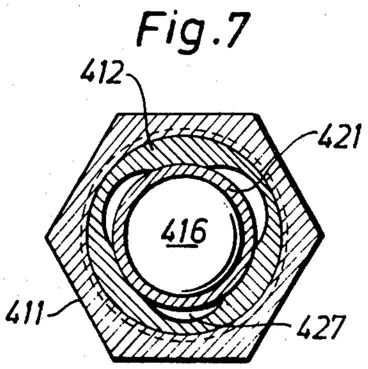
FIG. 7 being a section along the line VII—VII in FIG. 6.

A modified holding valve 410 is thus illustrated schematically in FIG. 6. As before, this valve has an inlet port 420 and an outlet port 422 which are connected by conduits 441 and 442 to one connection port of a working cylinder 434 and an operating valve 436, respectivrely. The latter valve directs the flow from a pump 438 and communicates via a conduit 440 with the opposite connection port of the working cylinder 434. As previously, the holding valve 410 is controlled via a pilot conduit 430 by a control valve 432 which is in communication with the tank or sump 444 of the system.

The holding valve 410 includes a valve housing 411 with an internal bore 405 extending from the right hand end of the housing, as viewed in the Figure. The bore is closed off by a cover 412, formed with a seat 417 for the valve element of the holding valve, said element consisting of a ball 416 in this case also. The seating 417 separates an inlet chamber 422 formed in the cover 412 from the outlet port 422, which can be formed in a plug 412' screwed into the cover 412.

In contrary to previously described embodiments of the holding valve in accordance with the invention, no leakage gap is formed around the ball 416, the gap being formed in a movable sleeve 421 instead, the ball being accommodated in a bore 423 in the sleeve, at its right hand end in the figure. The bore is terminated by an inner sealing edge 423' against which the ball 416 engages, as is clearly apparent from FIG. 6. According to circumstances, the ball can be arranged fixedly in the sleeve, e.g. with a light press fit, or it can move in the bore 423. A second bore 419 extends inwards from the other end of the sleeve 421, to form a guide for a spigot 418 rigidly mounted at the bottom end of the bore 405 in the housing 411, and coaxial therewith. A leakage gap 413 is formed between the spigot 418 and sleeve 421, as described below. The right-hand portion of the spigot 418 form a portion with a reduced diameter, and between the shoulder formed by the juncture to this waisted portion and an internal flange or shoulder 409 in the sleeve 421 there is inserted a spring 414 which thus urges the sleeve 421 with the ball 146 to the right and into engagement against the seat 417. The right-hand end of the sleeve is guided in the bore in the cover 412 forming the inlet chamber 424, see FIG. 6. A small valve seat 425 is adapted at the end of the waisted portion of spigot 418, said seat in communication, via a non-return valve 450, with an auxiliary chamber 428, to which the pilot conduit 430 from the control valve 432 is connected, all analogous with preceding embodiments.

The inlet port 420 of the holding valve 410 is in communication, via a passage 406, with the bore 405 of the housing 411, this bore in turn being (see FIG. 7) in communication, via recesses 427 in the cover 412, with the inlet chamber 424.

The holding valve 410 functions in principle in the same mode as the previously described embodiments, although in this case the valve ball does not move alone but together with the described sleeve 421, the left-hand bore of which forms an operating chamber 415 between the ball 416 and spigot 418. As mentioned, between the latter and the left-hand end of the sleeve 421 there is formed a gap 413 corresponding to the leakage gap about the valve ball in previous embodiments. Thus, when the control valve 432 opens, the pressure in the operating chamber 416 is led off via the valve seating 425 to the auxiliary chamber 428 and pilot conduit 430, the pressure in the inlet chamber 424 thrusting the valve ball 416 with the sleeve 421 from the seat 417 against the bias of the spring 414. As before, the ball 416 assumes a balanced position in relation to the valve seat 425, so that the leakage flow through the gap 413 to the secondary chamber 415 and further out through the pilot conduit 430 is restricted. When the control valve 432 is closed, pressure is once again built up in the secondary chamber 415 via the gap 413, and the valve ball 416 returns to engagement with the seat 417, under the action of both spring 414 and the increasing pressure in the operating chamber 415. In the case illustrated, the length of the gap 413 is varied during movement of the sleeve 421, but if this length needs to be constant, an annular recess is formed on the inside of the sleeve to the right of the spigot 418. In certain cases it can be advisable to make the gap 413 itself very small, and instead arrange the necessary leakage via longitudinal grooves on the inside 419 of the sleeve 421 or on the outside of the spigot 418.

One skilled in the art ought to be able to propose other embodiments of the holding valve in accordance with the invention, and the invention is thus not limited to the embodiments described and illustrated here, but further variations and modifications are possible within the scope of the invention.

We claim:

1. In a hydraulic blocking or holding valve including a valve housing having a hollow interior with an inlet and an outlet and a valve body shiftable to close a main valve seat for interrupting the communication between the inlet and outlet and alternately to open said main valve seat for permitting said communication, the valve body being arranged between two chambers in said housing interior, namely one inlet chamber in communication with the inlet and located between the valve body and the valve seat, and one operating chamber located on the opposite side of the valve body from the valve seat, a throttling or constricting passage via which the inlet chamber and the operating chamber are in communication with each other for counteracting flow of hydraulic liquid between the chambers, and control valve means in normally unconstricted communication with the operating chamber and actuable for lowering the pressure in the operating chamber in relation to the pressure in the inlet chamber to thereby create a pressure difference between the two chambers causing the valve body to shift to an open position opening said main valve seat, wherein the improvement comprises a constriction means responsive to said shifting of said valve body to its open position for constricting but not stopping the outflow of hydraulic liquid from the operating chamber to said valve means, said valve body being a ball received in a movable sleeve communicating with said inlet chamber, said housing including a fixed internal spigot protruding into the housing interior and separated from said main valve seat by said ball, spring means backed with respect to said housing for urging said ball against said valve seat and away from said spigot, said sleeve being slidable over said spigot and defining with the spigot said operating chamber, a sliding gap between said sleeve and spigot forming said throttling passage between the inlet chamber and operating chamber, an orifice in said spigot providing said normally unconstricted communication of said operating chamber with said valve means, said orifice being located in said operating chamber to face said ball, said spring means being dimensioned for causing said ball, in response to said shifting of said ball and sleeve away from said main valve seat by said pressure difference, to assume an almost abutting relation with said spigot at said orifice forming said constriction means therebetween, for simultaneously constricting outflow into the orifice and maintaining the constricted outflow of hydraulic liquid from the operating chamber through the orifice to the open valve means.

2. A holding valve as claimed in claim 1, and connected into the hydraulic system of a work machine having work cylinders, such as a loading or excavating machine, to prevent hydraulic liquid leaking out of the system from one or more of the working cylinders of the machine, and thereby preventing e.g. sinking of a work implement or other load supported by the cylinder or cylinders, wherein said valve means for lowering the pressure in the operating chamber comprises a normally closed valve adapted to be opened to put, via said non-return valve and constriction means, the operating chamber in communication with an exhaust outlet, so that the holding valve is opened and lowering movement of the cylinder or cylinders is allowed.

3. A holding valve as claimed in claim 1, wherein the constriction means at the operating chamber is connected to a non-return valve permitting outflow from, bot not inflow to, the operating chamber via the constriction means.

4. A holding valve as claimed in claim 1 wherein said spring comprises a compression spring means arranged to counterbalance the pressure drop from the inlet chamber to the operating chamber, at pressures up to the maximum operating pressure of the holding valve, for resiliently holding said valve body out of closing contact with said orifice, said valve body having first and second end positions at the opposite ends of its travel, the first end position of said valve body being in closed engagement with said main valve seat, the second end position being in a range of positions all close-spaced from said orifice to limit but still permit a continuous outflow from said operating chamber through said open valve means, said second end position being resiliently adjusted in said range by said spring in response to changes in operating conditions.

* * * * *

UNITED STATES PATENT AND TRADEMARK OFFICE

CERTIFICATE OF CORRECTION

PATENT NO. : 4 391 183

DATED : July 5, 1983

INVENTOR(S) : Stig Broms, Lennart Freese and Stig Kervefors

It is certified that error appears in the above—identified patent and that said Letters Patent is hereby corrected as shown below:

On Abstract page, item [75] should read:

---Inventors: Stig Broms, Täby; Lennart Freese, Järfälla; Stig Kervefors, Ekerö, all of Sweden Claim 4:

Column 10, line 53 should read: ---spring means comprises a compression spring arranged---.

Signed and Sealed this

*Twenty-ninth* Day of *January 1985*

[SEAL]

*Attest:*

DONALD J. QUIGG

*Attesting Officer* *Acting Commissioner of Patents and Trademarks*